United States Patent [19]
Bennington

[11] Patent Number: 6,050,697
[45] Date of Patent: Apr. 18, 2000

[54] IMAGE PROJECTING CANDY UNIT

[76] Inventor: Eric N. Bennington, 3254 Windchase St., Houston, Tex. 77082

[21] Appl. No.: 09/154,858

[22] Filed: Sep. 17, 1998

[51] Int. Cl.[7] ..................................... F21V 33/00
[52] U.S. Cl. .......................... 362/109; 362/208; 362/253; 362/124; 362/186; 362/806
[58] Field of Search .................................... 362/109, 202, 362/205, 208, 253, 259, 124, 157, 186, 190, 806

[56] References Cited

U.S. PATENT DOCUMENTS

| | | | |
|---|---|---|---|
| 2,852,662 | 9/1958 | Garland | 362/205 |
| 3,401,596 | 9/1968 | Hirsch | 362/205 X |
| 4,149,224 | 4/1979 | King et al. | 362/157 |
| 4,577,263 | 3/1986 | Maglica | 362/205 X |
| 4,914,748 | 4/1990 | Schlotter, IV et al. | 362/208 X |
| 5,471,373 | 11/1995 | Coleman et al. | 362/109 |
| 5,615,941 | 4/1997 | Shecter | 362/109 |
| 5,676,988 | 10/1997 | Coleman et al. | 362/109 X |
| 5,733,033 | 3/1998 | Coleman et al. | 362/109 |

*Primary Examiner*—Laura K. Tso

[57] ABSTRACT

An illuminated candy unit is provided including a housing for accepting at least one battery. The housing further includes an open outboard end and a lamp mounted therein for emitting light from the open outboard end of the housing upon the receipt of power. Also included is a switch assembly for selectively providing the lamp with power from the battery. Releasably mounted on the open outboard end of the housing is a candy piece. An image generator is coupled in the housing between the open outboard end of the housing and the lamp. The image generator includes an opaque print of an image, wherein the image is projected from the open outboard end of the housing upon the emission of light by the lamp.

5 Claims, 2 Drawing Sheets

IMAGE PROJECTING CANDY UNIT

BACKGROUND OF THE INVENTION

1, Field of the Invention

The present invention relates to illuminated candy mounts and more particularly pertains to a new image projecting candy unit for projecting an image on a recipient surface with a unit having a piece of candy mounted thereon.

2. Description of the Prior Art

The use of illuminated candy mounts is known in the prior art. More specifically, illuminated candy mounts heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminated candy mounts and the like include U. S. Pat. No. 4,914,748; U.S. Pat. No. 5,471,373; U.S. Pat. No. 5,615,941; U.S. Pat. No. 5,545,069; U.S. Pat. Des. 353,251; and U.S. Pat. No. 3,532,875.

In these respects, the image projecting candy unit according to the present invention substantially departs from the conventional concepts and designs of the prior art, and in so doing provides an apparatus primarily developed for the purpose of projecting an image on a recipient surface with a unit having a piece of candy mounted thereon.

SUMMARY OF THE INVENTION

In view of the foregoing disadvantages inherent in the known types of illuminated candy mounts now present in the prior art, the present invention provides a new image projecting candy unit construction wherein the same can be utilized for projecting an image on a recipient surface with a unit having a piece of candy mounted thereon.

The general purpose of the present invention, which will be described subsequently in greater detail, is to provide a new image projecting candy unit apparatus and method which has many of the advantages of the illuminated candy mounts mentioned heretofore and many novel features that result in a new image projecting candy unit which is not anticipated, rendered obvious, suggested, or even implied by any of the prior art illuminated candy mounts, either alone or in any combination thereof.

To attain this, the present invention generally comprises a housing with a hollow cylindrical configuration. The housing includes an open inboard end for accepting at least one battery therein. A cap is releasably mounted on the open inboard end for containing the battery within the housing. As shown in FIG. 3, the housing further includes an open outboard end having an outer surface with external threads formed therein. Next provided is a lamp assembly including a hemispherical reflector mounted within an interior space of the housing adjacent to the battery. The lamp assembly further includes an incandescent lamp mounted on the reflector for emitting light from the open outboard end of the housing upon the receipt of power. FIG. 3 shows a switch assembly including a push button momentary switch mounted on a peripheral edge of the open outboard end of the housing. Such switch is connected between the battery and the lamp for supplying power to the lamp upon the depression thereof. It should be noted that the push button momentary switch is movable along an axis which is parallel with that of the housing. An image generator is provided including a transparent ball having a diameter about equal to that of the interior space of the housing. The transparent ball includes a pair of diametrically opposed arms coupled within a pair of diametrically opposed bores formed in the housing. As shown in FIG. 3, the transparent ball is positioned between the open outboard end of the housing and the lamp. The transparent ball further includes a unique opaque print such as a bat formed on an inner face thereof. By this structure, an image of a bat is emitted from the open outboard end of the housing upon the emission of light by the lamp. A candy mount includes a cylindrical sleeve with a pair of open ends, a knurled outer surface, and an inner surface. Such inner surface is equipped with an inboard portion that has a plurality of interior threads and an outboard portion with an annular recess formed therein for reasons that will soon become apparent. Finally, a colored candy piece includes a conical outboard extent and a cylindrical inboard extent with a reduced diameter, as shown in FIG. 4. The cylindrical inboard extent is adapted for being received within the sleeve of the candy mount while a periphery of the conical outboard extent of the candy piece is positioned within the annular recess of the candy mount. In use, the threads of the candy mount are removably coupled with those of the housing. When the candy mount is rotated to a sufficient extent in a predetermined direction, an inwardly extending annular flange of the candy mount is adapted to depress the push button of the switch assembly in order to emit the image. It should be noted that the image is adapted to be best seen when the candy is eaten or removed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new image projecting candy unit apparatus and method which has many of the advantages of the illuminated candy mounts mentioned heretofore and many novel features that result in a new image projecting candy unit which is not anticipated, rendered obvious, suggested, or even implied by any of the prior art illuminated candy mounts, either alone or in any combination thereof.

It is another object of the present invention to provide a new image projecting candy unit which may be easily and efficiently manufactured and marketed.

It is a further object of the present invention to provide a new image projecting candy unit which is of a durable and reliable construction.

An even further object of the present invention is to provide a new image projecting candy unit which is susceptible of a low cost of manufacture with regard to both materials and labor, and which accordingly is then susceptible of low prices of sale to the consuming public, thereby making such image projecting candy unit economically available to the buying public.

Still yet another object of the present invention is to provide a new image projecting candy unit which provides in the apparatuses and methods of the prior art some of the advantages thereof, while simultaneously overcoming some of the disadvantages normally associated therewith.

Still another object of the present invention is to provide a new image projecting candy unit for projecting an image on a recipient surface with a unit having a piece of candy mounted thereon.

Even still another object of the present invention is to provide a new image projecting candy unit that includes a housing for accepting at least one battery. The housing further includes an open outboard end and a lamp mounted therein for emitting light from the open outboard end of the housing upon the receipt of power. Also included is a switch assembly for selectively providing the lamp with power from the battery. Releasably mounted on the open outboard end of the housing is a candy piece. An image generator is coupled in the housing between the open outboard end of the housing and the lamp. The image generator includes an opaque print of an image, wherein the image is projected from the open outboard end of the housing upon the emission of light by the lamp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
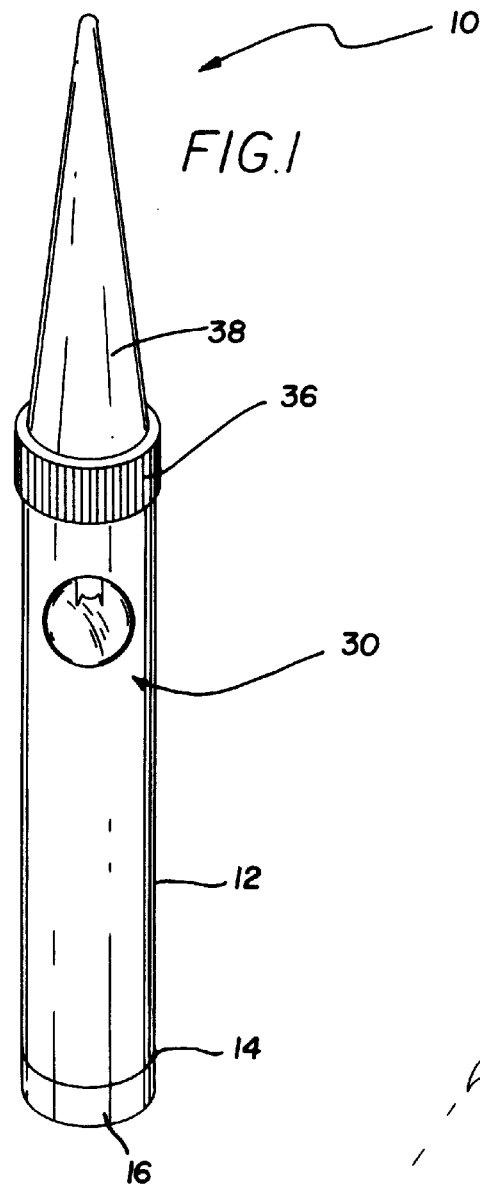
FIG. 1 is a side view of a new image projecting candy unit according to the present invention.
Figure 2:
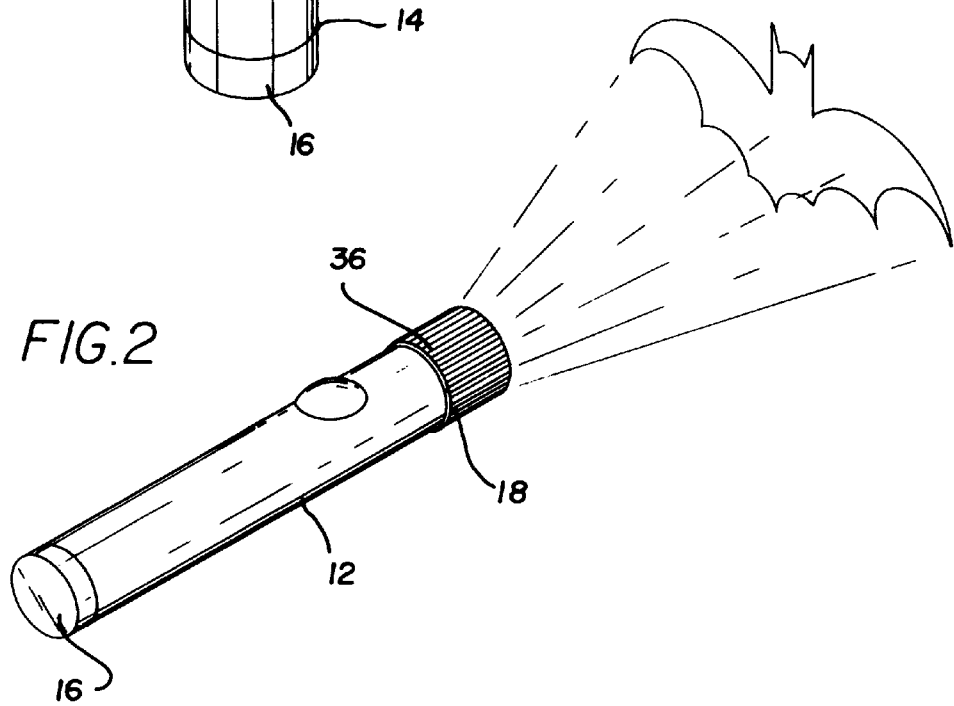
FIG. 2 is a perspective view of the present invention during use after the candy piece is removed.

With reference now to the drawings, and in particular to FIGS. 1 through 4 thereof, a new image projecting candy unit embodying the principles and concepts of the present invention and generally designated by the reference numeral 10 will be described.

Figure 3:
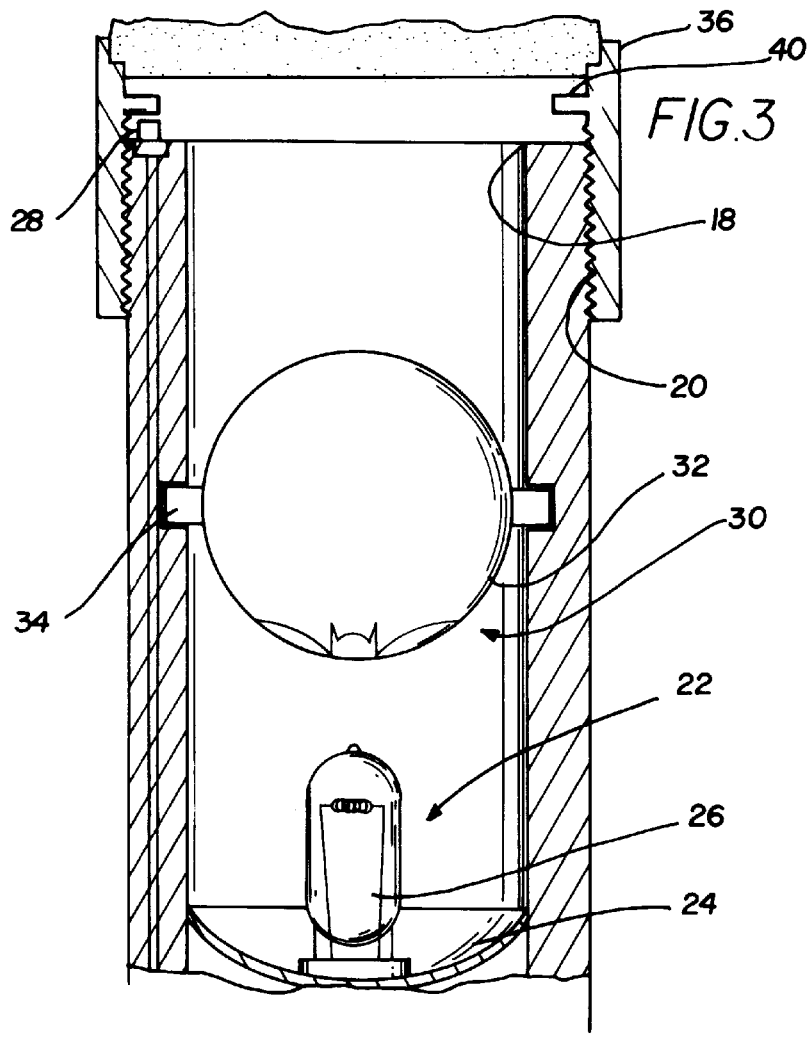
FIG. 3 is a side cross-sectional view of the present invention.

The present invention, designated as numeral 10, includes a housing 12 with a hollow cylindrical configuration. The housing includes an open inboard end 14 for accepting at least one battery therein. A cap 16 is releasably mounted on the open inboard end for containing the battery within the housing. As shown in FIG. 3, the housing further includes an open outboard end 18 having an outer surface with external threads 20 formed thereon.

Next provided is a lamp assembly 22 including a hemispherical reflector 24 mounted within an interior space of the housing adjacent to the battery. The lamp assembly further includes an incandescent lamp 26 mounted on the reflector for emitting light from the open outboard end of the housing upon the receipt of power.

FIG. 3 shows a switch assembly including a push button momentary switch 28 mounted on a peripheral edge of the open outboard end of the housing. Such switch is connected between the battery and the lamp for supplying power to the lamp upon the depression thereof. It should be noted that the push button momentary switch is movable along an axis which is parallel with that of the housing.

An image generator 30 is provided including a transparent ball 32 having a diameter about equal to that of the interior space of the housing. The transparent ball includes a pair of diametrically opposed arms 34 coupled within a pair of diametrically opposed bores formed in the housing. As shown in FIG. 3, the transparent ball is positioned between the open outboard end of the housing and the lamp. The transparent ball further includes a unique opaque print such as a bat or any other character. By this structure, an image is projected from the open outboard end of the housing upon the emission of light by the lamp. As an option, a portion of the ball may protrude from an opening formed in the housing for allowing the manual rotation of the ball.

A candy mount 36 includes a cylindrical sleeve with a pair of open ends, a knurled outer surface, and an inner surface. Such inner surface is equipped with an inboard portion that has a plurality of interior threads and an outboard portion with an annular recess formed therein for reasons that will soon become apparent.

Figure 4:
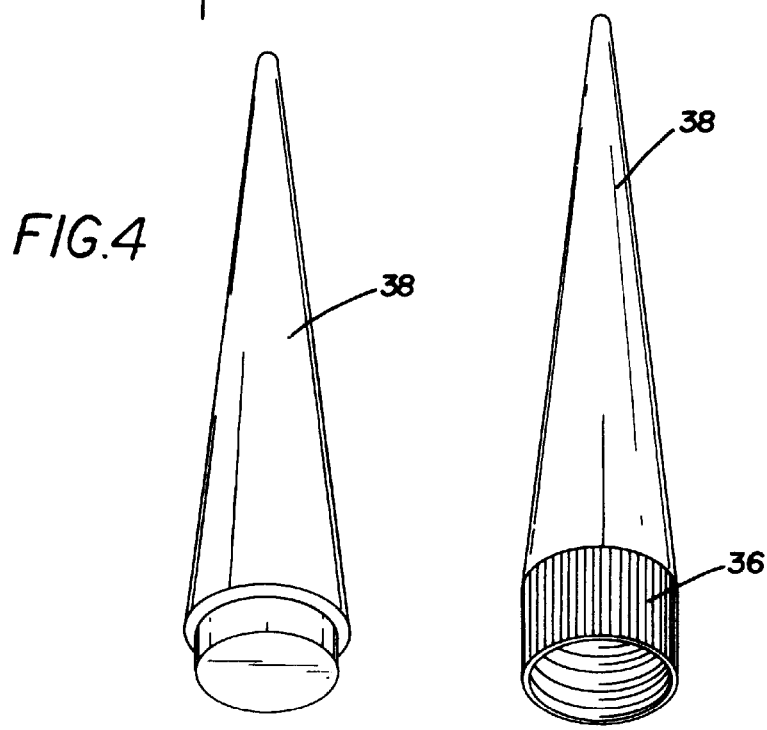
FIG. 4 is a side view of the candy piece with and without the candy mount attached thereto.

Finally, a candy piece 38 includes a conical outboard extent and a cylindrical inboard extent with a reduced diameter, as shown in FIG. 4. The cylindrical inboard extent of the candy piece is adapted for being received within the sleeve while a periphery of the conical outboard extent of the candy piece is positioned within the annular recess of the candy mount.

In use, the threads of the candy mount are removably coupled with those of the housing. When the candy mount is rotated to a sufficient extent in a predetermined direction, an inwardly extending annular flange 40 of the candy mount is adapted to depress the push button of the switch assembly in order to emit the image. It should be noted that the image is adapted to be best seen when the candy is removed or eaten.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated candy unit comprising, in combination:

a housing with a hollow cylindrical configuration including an open inboard end for accepting at least one battery therein, a cap releasably mounted on the open inboard end for containing the battery within the housing, the housing further including an open outboard end having an outer surface with external threads formed therein;

a lamp assembly including a hemispherical reflector mounted within an interior space of the housing adjacent to the battery, the lamp assembly further including an incandescent lamp mounted on the reflector for emitting light from the open outboard end of the housing upon the receipt of power;

a switch assembly including a push button momentary switch mounted on a peripheral edge of the open outboard end of the housing and connected between the battery and the lamp for supplying power to the lamp upon the depression thereof, wherein the push button momentary switch is movable along an axis which is parallel with that of the housing;

an image generator including a transparent ball having a diameter about equal to that of the interior space of the housing, the transparent ball including a pair of diametrically opposed arms coupled within a pair of diametrically opposed bores formed in the housing between the open outboard end of the housing and the lamp, the transparent ball further including an opaque print of a bat formed on an inner face thereof, wherein an image of a bat is emitted from the open outboard end of the housing upon the emission of light by the lamp;

a candy mount including a cylindrical sleeve with a pair of open ends, a knurled outer surface, and an inner surface, the inner surface having an inboard portion that has a plurality of interior threads, the inner surface having an outboard portion opposite the inboard portion with the outboard portion having an annular recess formed therein; and a colored candy piece including a conical outboard extent and a cylindrical inboard extent with a reduced diameter for being received within the sleeve of the candy mount while a periphery of the conical outboard extent of the candy piece is positioned within the annular recess of the candy mount;

wherein the threads of the candy mount are adapted for removably coupling with those of the housing and an inwardly extending annular flange of the candy mount is adapted to depress the push button of the switch assembly.

2. An illuminated candy unit comprising:

a housing for accepting at least one battery, the housing further including an open outboard end;

a lamp mounted within the housing for emitting light from the open outboard end of the housing upon the receipt of power;

a switch assembly for selectively providing the lamp with power from the battery;

a candy piece releasably mounted on the open outboard end of the housing; and an image generator including a transparent ball having a diameter about equal to that of an interior space of the housing, the transparent ball including a pair of diametrically opposed arms coupled within a pair of diametrically opposed bores formed in the housing between the open outboard end of the housing and the lamp, the transparent ball further including an opaque print of a image formed on an inner face thereof, wherein the image is projected from the open outboard end of the housing upon the emission of light by the lamp.

3. An illuminated candy unit as set forth in claim 2 wherein the candy piece is coupled to a candy mount which is releasably mounted to the housing.

4. An illuminated candy unit as set forth in claim 3 wherein the candy mount is releasably mounted to the housing by way of threads.

5. An illuminated candy unit as set forth in claim 4 wherein a switch is mounted adjacent to the open outboard end of the housing for supplying the lamp with power when the candy mount is rotated in a predetermined direction.

* * * * *